(12) United States Patent  (10) Patent No.: US 7,857,036 B2
Bergqvist et al.  (45) Date of Patent: Dec. 28, 2010

(54) METHOD AND DEVICE FOR ASSESSING THE RISK OF FLUID LEAKAGE IN A HEAT EXCHANGER WITH SENSOR

(75) Inventors: Jan-Ove Bergqvist, Malmo (SE); Magnus Svensson, Lund (SE)

(73) Assignee: Alfa Laval Corporate AB, Lund (SE)

( * ) Notice: Subject to any disclaimer, the term of this patent is extended or adjusted under 35 U.S.C. 154(b) by 111 days.

(21) Appl. No.: 12/372,067

(22) Filed: Feb. 17, 2009

(65) Prior Publication Data

US 2009/0151890 A1 Jun. 18, 2009

Related U.S. Application Data

(62) Division of application No. 11/597,945, filed as application No. PCT/SE2005/000702 on May 17, 2005, now Pat. No. 7,568,516.

(30) Foreign Application Priority Data

Jun. 4, 2004 (SE) .................................. 0401434

(51) Int. Cl.
   *B60H 1/00* (2006.01)
(52) U.S. Cl. ..................................... 165/11.1
(58) Field of Classification Search .................. 73/1.01, 73/114.18, 862.68; 165/11.1, 11.2
   See application file for complete search history.

(56) References Cited

U.S. PATENT DOCUMENTS

| 4,686,861 | A | 8/1987 | Morii |
| 5,793,150 | A | 8/1998 | Kober et al. |
| 6,739,183 | B1 | 5/2004 | Kestly |
| 7,111,505 | B2 | 9/2006 | Kestly et al. |
| 7,152,663 | B2 | 12/2006 | Helin et al. |
| 2008/0196873 | A1 | 8/2008 | Svensson |

FOREIGN PATENT DOCUMENTS

| DE | 3006656 | 9/1981 |
| EP | 0520380 | 12/1992 |
| GB | 2062833 | 5/1981 |
| WO | 2004/023055 | 3/2004 |

OTHER PUBLICATIONS

Int'l Search Report in PCT/SE2005/000702.

*Primary Examiner*—John Fitzgerald
(74) *Attorney, Agent, or Firm*—Fish & Richardson P.C.

(57) ABSTRACT

A method and device, for a heat exchanger which is provided with gaskets, for assessing and detecting the risk of fluid leakage in the heat exchanger due to worn-out gaskets. In the heat exchanger, a heat transfer plate (5) with gasket (6) is provided with a pressure sensor (15) which monitors the pressure between the plate (5) and the gasket (6). A further sensor is adapted to the heat exchanger for monitoring the pressure of the fluid entering the heat exchanger.

6 Claims, 3 Drawing Sheets

METHOD AND DEVICE FOR ASSESSING THE RISK OF FLUID LEAKAGE IN A HEAT EXCHANGER WITH SENSOR

This application is a divisional (and claims the benefit of priority under 35 USC 120-121) of U.S. application Ser. No. 11/597,945, filed Nov. 28, 2006 now U.S. Pat. No. 7,568,516, which claims the benefit under 35 USC 371 of PCT International Application No. PCT/SE2005/000702, filed on May 17, 2005, and also claims the benefit of foreign priority Swedish Application No. 0401434-6, filed Jun. 4, 2004. The disclosures of the prior applications are considered part of (and are hereby incorporated by reference in) the disclosure of this application.

FIELD OF THE INVENTION

The present invention relates to an apparatus and method, for assessing the risk of fluid leakage in a plate heat exchanger provided with gaskets.

Heat exchangers provided with gaskets traditionally comprise a number of heat transfer plates which together with intermediate gaskets constitute a plate package. The gaskets are normally held in position by, for example, adhesive bonding or by the plate package being clamped between two end-plates or pressure plates pressed together so that the gaskets are fixed and held in position. To render a plate heat exchanger easy to dismantle and service, e.g. with a view to remedying leakage due to defective or worn-out gaskets, the end-plates or pressure plates are usually connected mechanically to the plate package and supported by a frame. Worn-out and defective gaskets are a common cause of fluid leakage in a heat exchanger and it is therefore usual that the gaskets need replacing at regular intervals of time.

BACKGROUND TO THE INVENTION

Heat exchangers comprising various types of sensors for measuring various operating parameters such as the temperature and pressure of the fluid passing through a heat exchanger are known. Sensors for detecting fluid leakage in a heat exchanger are also known.

British patent specification GB 2062833-A describes a heat exchanger for, inter alia, a health-damaging fluid. The heat exchanger is made up of heat exchanger plates which have portholes, are welded together in pairs and are installed with gaskets between each pair of welded plates. The region round the ports comprises a first gasket which is situated close to the port orifice and thereby has fluid contact round it, and a second gasket which is situated outside the first gasket so that a space is formed between the gaskets. In the event of leakage through the first gasket, fluid enters the space between the gaskets and is thereby prevented from mixing with other fluid in the heat exchanger. A sensor is installed in such a way that it extends through the second gasket and into the space between the gaskets. The purpose of the sensor is to monitor and indicate fluid entering the space between the gaskets, which will mean that the first gasket nearest to the port has failed and needs changing. The disadvantage of the invention according to GB 2062833-A is that only when the gasket has failed and leakage in the heat exchanger has already occurred does the sensor provides an indication.

European patent specification EP 0520380-A1 describes a gasket for a vehicle engine, which gasket comprises sensors for pressure monitoring. The sensor is situated between two gasket halves together with seal means for preventing direct contact with fluid. The disadvantage of the invention according to EP 0520380-A1 is the complicated gasket structure which means that the gasket is expensive to manufacture and involves a number of manufacturing steps to finished product. A further disadvantage of gaskets made up of a number of parts is that the parts may delaminate from one another, which may result in the gasket starting to leak. A further disadvantage is that the sensors are only intended to measure pressure in the gasket, and the arrangement is not equipped for assessing the risk of leakage due to the gasket having failed. A further disadvantage of the gasket is that its configuration is such that it is impossible to apply it to heat exchanger plates, since it is designed to seal between two relatively large flat surfaces and not for fitting into a gasket recess in a heat exchanger plate.

SUMMARY OF THE INVENTION

One object of the present invention is to provide a method whereby it is possible, in a heat exchanger provided with gaskets, to determine when gasket replacement is required in order to prevent leakage through a gasket taking place because of failure or wear, and whereby the aforesaid problems are eliminated.

A further object of the present invention is to provide a method for monitoring gasket material functionality in a heat exchanger provided with gaskets.

The aforesaid and other objects are achieved according to the invention by the method described in the introduction being provided with the characteristics indicated by claim 1.

An advantage afforded by a method according to the characterising part of claim 1 is the possibility of assessing on the basis of the compression pressure monitored the risk of fluid leakage in a plate heat exchanger provided with gaskets. It thus becomes possible to predict when gaskets in heat exchangers need replacing in order to prevent gaskets failing during operation.

A further object of the present invention is to provide, for a heat exchanger provided with gaskets, a method for indicating the risk of fluid leakage, which method is economically advantageous relative to the cost of replacing gaskets in a heat exchanger when leakage through the latter's gaskets has occurred. Another object is that the method should be easy to apply and result in savings of time relative to comparable techniques.

Preferred embodiments of the method according to the invention have been further provided with the characteristics indicated by subclaims 2-6.

According to another embodiment of the method according to the invention, the compression pressure of the gasket material is registered by means of a first sensor. Pressure changes in the heat exchanger can thus be detected at an early stage in the operation of the heat exchanger. Pressure changes may for example be due to gasket wear or to plates not being firmly clamped between the end-plates or pressure plates. Monitoring pressure changes at an early stage minimises the risk of leakage occurring through or past the gaskets.

According to a further embodiment of the method according to the invention, the pressure of the fluid in the heat exchanger is measured by means of a second sensor which also gives the pressure of the fluid relative to the gasket material. Pressure changes in the aforesaid fluid are thus detected. Using such a second sensor also makes it possible to check that the heat exchanger is not overpressured, i.e. not pressurised beyond a predetermined upper limit value. Supervising the pressure of the fluid in the heat exchanger, inter alia so that overpressure can be avoided, makes it possible to lengthen the life of the heat exchanger and its components by avoiding wear due to high pressure. To ensure correct monitoring of the fluid pressure, the second sensor is installed in such a way that it has fluid contact with the fluid in the heat exchanger. The highest pressure in the fluid of a heat exchanger is normally at the inlet to the heat exchanger, after which the pressure declines through the heat exchanger pro rata to the distance from said inlet This means that the location of the second sensor need not be confined to the heat exchanger itself. Instead, the sensor may be situated at any desired point along the flow path of the fluid to the heat exchanger from the last component of the heat exchanger system. The last component of the heat exchanger system is defined as the last component which has the possibility of influencing the characteristic of the fluid entering the heat exchanger, i.e. the pressure. This last component may for example be a pump which supplies the heat exchanger with fluid.

In a further embodiment of the method according to the invention, the values registered by the various sensors are processed in a processor. The values registered are used to calculate a reference value, a so-called differential pressure value, which is compared with a predetermined set-value. This comparison makes it possible to detect quickly any deviations which might be due to a gasket being worn out or about to fail. Such deviation will activate an indicator to attract attention, e.g. a lamp or some other signal. Gasket replacement in the heat exchanger can thus be effected before leakage occurs.

A further object of the present invention is to provide a device for a heat exchanger provided with gaskets which enables simultaneous monitoring of the fluid pressure of the heat exchanger and the compression pressure of the gaskets.

The aforesaid and other objects are achieved according to the invention by the heat exchanger described in the introduction being provided with the characteristics Indicated by claim 1.

An Advantage afforded by a device according to the characterising part of claim 1 is the possibility of measuring in the heat exchanger both the fluid pressure of the fluids and the compression pressure of the gaskets. It thus becomes possible to measure the difference between the aforesaid [measurements] and predetermined set-values so that deviations of the pressure values measured can be detected. Such deviations may for example indicate that a gasket is worn out and needs replacing if failure or leakage through it is not to occur.

A further object of the present invention is to provide in a heat exchanger provided with gaskets a device for indicating the risk of fluid leakage, which device is economically advantageous relative to the cost of replacing gaskets in a heat exchanger when leakage has occurred through the latter's gaskets. Another object is that the device should be easy to construct and also result in savings of time relative to comparable techniques.

Preferred embodiments of the device according to the invention have been further provided with the characteristics indicated by subclaims 2-6.

In a further embodiment of the device according to the invention, the first sensor is situated in a recess arranged for a gasket in the plate and is adapted to monitoring the pressure between the gasket and the plate. The compression pressure of the gasket can thus be monitored. An advantage of situating the sensor in the gasket recess is that the sensor is protected from extraneous influences. A further advantage of sensors being situated in gasket recesses is that when the plates are pressed together the sensors are clamped and positioned between gasket and plate, thereby holding the sensors in position.

In a further embodiment of the device according to the invention, the first sensor for monitoring the compression pressure of the gasket is situated between the heat transfer plates which together form a flow channel. This channel may be the channel which is the first recipient of the hot fluid entering the heat exchanger. This means that it is in this channel that the incoming fluid is at its highest temperature in the heat exchanger and hence also has the greatest effect on the gaskets.

BRIEF DESCRIPTION OF THE DRAWINGS

Preferred embodiments of the device and the method according to the invention are described below with reference to the attached schematic drawings, which depict only the components which are necessary for understanding the invention.

DETAILED DESCRIPTION OF VARIOUS EMBODIMENTS OF THE INVENTION

Figure 1:
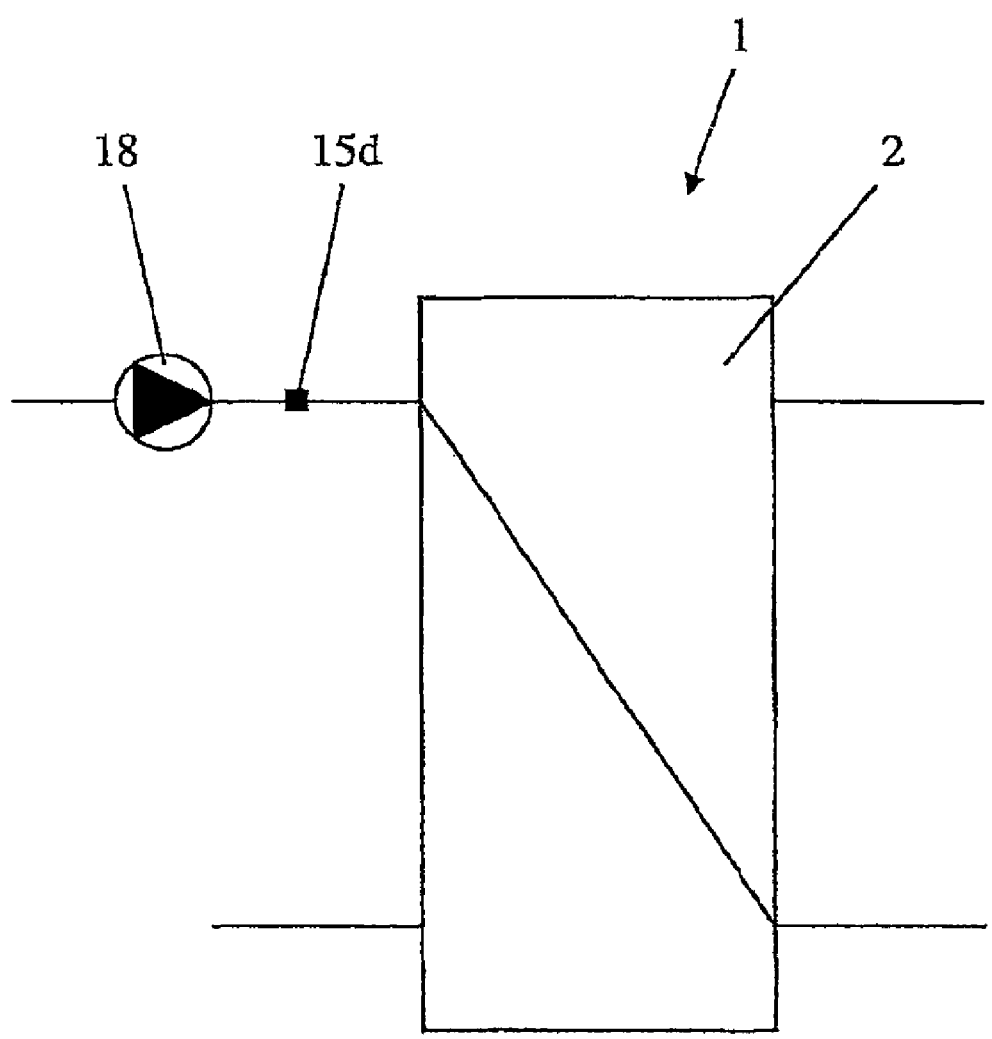
FIG. 1 depicts schematically a heat exchanger system comprising a heat exchanger with various pipe connections and a component which by its function is the last component which can influence the characteristic of the incoming fluid, i.e. the pressure of the fluid.
Figure 2:
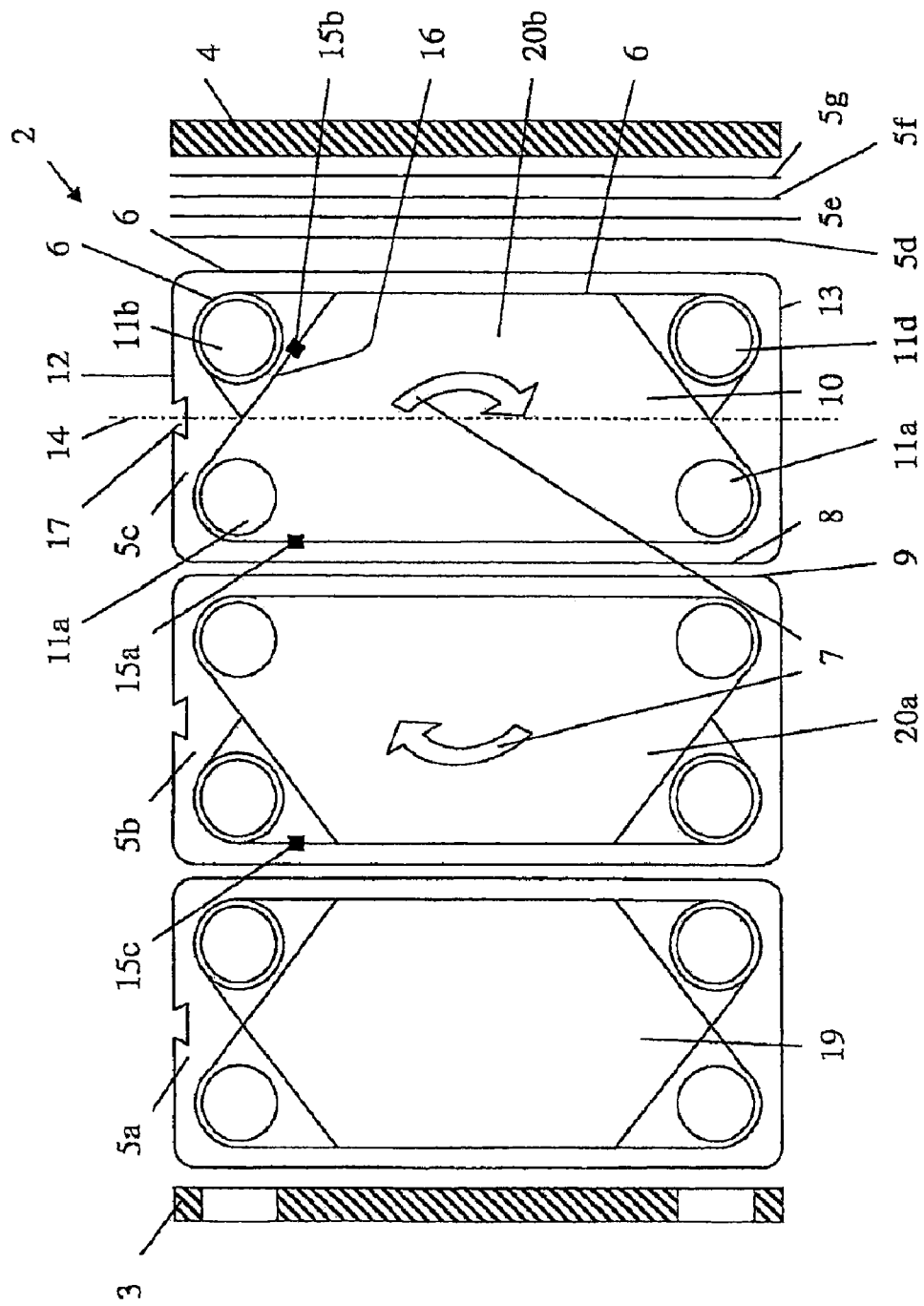
FIG. 2 depicts part of a heat exchanger according to the invention, with a frame plate and a pressure plate and, between these, a number of heat transfer plates and gaskets. To facilitate comprehension, the heat transfer surfaces of the first three plates are turned towards the reader.

FIG. 1 depicts a heat exchanger system (1) with inter alia a heat exchanger (2). The heat exchanger (2) comprises a frame plate (3) comprising inlet and outlet ports, see FIG. 2, and a pressure plate (4). A number of heat transfer plates (5a, 5b, 5c and so on) with gaskets (6) are situated between said frame plate (3) and pressure plate (4). In the ensuing text, the heat transfer plates (5a, 5b, 5c and so on) will only be referred to as plates (5a, 5b, 5c and so on). FIG. 2 makes it clear how the gaskets (6) of the heat exchanger (2) are arranged by showing three of the plates (5a-5c) turned 90 degrees about a vertical centreline (14) so that the heat transfer surfaces (10) of the plates (5) are turned towards the observer. In addition, the fluid flow is indicated schematically in the diagram by arrows (7).

In the preferred embodiment of the invention, each plate (5) has four ports (11a, 11b, 11c and 11d) located in such a way that each corner portion of a plate (5) comprises a port. Each plate (5) further comprises a heat transfer surface (10) and two longitudinal edges, viz. a left edge (8) and a right edge (9), a top edge (12) and a bottom edge (13). The centreline (14) extends from the top edge (12) to the bottom edge (13) (between the two upper ports (11a and 11b) and between the two lower ports (11c and 11d)) and divides the plate (5c) into two halves.

The gasket (6) is situated in a gasket recess (not depicted in the drawing) in the plate (5) and extends round the heat transfer surface (10) of the plate (5) and round the latter's ports (11a, 11b, 11c and 11d).

Figure 3:
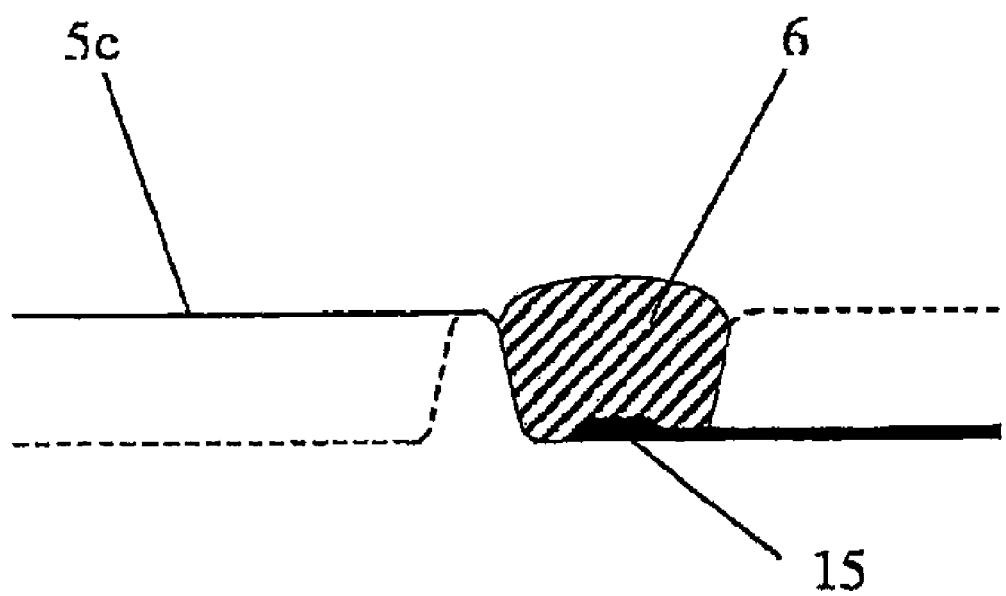
FIG. 3 depicts a transverse cutaway view of a plate and a gasket with a sensor situated between the plate and the gasket.

The plates in FIG. 2 are shown numbered from the left, the first plate (5a) being situated nearest to the frame plate (3). A sensor (15a) is situated on the third plate (5c). The sensor (15a), see FIG. 3, is situated between the gasket (6) and the plate (5c) in such a way that it abuts against both the gasket (6) and the plate (5c). The sensor (15a) is positioned at the upper left region of the plate (5c), along the longitudinal left edge (8) and lower than the upper left port (11a). In this region the gasket (6) is subject to the largest of the various fatigue factors which are all contributory causes to the possibility of a gasket failing. Examples of the fatigue factors are temperature fluctuations, friction, fluid contact and oxygen contact from the outside of the heat exchanger. Oxygen contact will dry the gasket (6), thereby contributing to the gasket (6) initially beginning to crack before subsequently failing completely.

In an alternative embodiment of the invention, a sensor (15b) is installed along a gasket diagonal (16). FIG. 2 shows the gasket diagonal (16) extending from the top of the left upper port (11a) on the third plate (5c) towards the longitudinal right edge (9) at the underside of the upper right port (11b). With this positioning, it is desirable that the sensor (15b) be located on the portion of the gasket diagonal (16) which is situated to the right of the centreline (14) of the plate (5c). The fact that plates are normally equipped with suspension devices (17) situated in the region between the upper ports (11a and 11b) makes it undesirable for sensors to be located on the portion of the gasket diagonal (16) which is nearest to the suspension devices (17) and which extends to the left of the centreline (14). This undesirability is because access to the sensors would then be difficult.

A second sensor (15d), see FIG. 1, is located at any desired point along the flow path of the fluid to the heat exchanger (2) from the last component (18), as seen in the direction of flow, of the heat exchanger system (1). The last component (18) of the heat exchanger system (1) is defined as the last component (18) which has the possibility of influencing the characteristic of the fluid entering the heat exchanger (2) e.g. the pressure. As previously mentioned, this last component (18) may for example take the form of a pump which supplies the heat exchanger (2) with fluid.

In the preferred embodiment of the invention, the aforesaid second sensor (15d), see FIG. 1, is located in such a way that the hot fluid entering the heat exchanger is monitored. This is because the pressure of the hot fluid relative to the gasket pressure in the channel for the hot fluid is crucial to being able to assess whether there is risk of leakage. Where so required by applications in which it is desirable to be able to register the incoming cold fluid, a sensor is located in such a way that the incoming cold fluid is monitored. The gasket pressure in the channel for the cold fluid is then monitored in a corresponding manner.

FIG. 2 indicates a space (19) formed between the frame plate (3) and the first plate (5a). This space (19) is drained and constitutes an insulating layer whereby the fluid flowing in a first channel (20a) (between the first and second plates (5a and 5b)) only has heat transfer with the fluid flowing in a second channel (20b) formed between the second and third plates (5b and 5c).

According to the preferred embodiment of the invention, the channels alternately contain cold and hot fluid, thus the first channel (20a) contains cold fluid, the second channel (20b) contains hot fluid, and so on.

In a plate package provided with gaskets, the greatest gasket wear and the greatest probability of gaskets failing are in the channels situated closest to a frame plate or pressure plate, since the gaskets there are subject to the highest temperatures and the greatest temperature fluctuations. The different respective thermal expansion coefficients of the frame plate and the pressure plate result in friction between the various plates, the gaskets, the frame plate and the pressure plate because they move differently in response to, for example, temperature fluctuations. Thus plates situated close to the frame plate and pressure plate do not adapt as easily to such movements as do plates located in the middle of a plate package, where all the plates situated close together move in a similar way. The aforesaid movements therefore contribute to the greatest risk of gasket failure being in the channel which first receives the incoming hot fluid and is located nearest to a frame plate or pressure plate.

The foregoing reasoning makes it clear why in the preferred embodiment of the invention the sensor (15a), see FIG. 2, is located in the upper left region of the plate (5c), below the upper left port (11a). This is the region in which the highest temperature prevails and such factors as thermal expansion coefficients impart to the mutually adjacent plates (5a-5c) and the frame plate (3) the greatest mutual mobility, thereby contributing to major stresses. The gasket (6) in this region is also exposed to oxygen action from the outside of the heat exchanger (2).

During operation, the plate heat exchanger provided with gaskets according to the invention functions in the following manner.

The sensor (15a) monitors the pressure which the gasket (6) and the plate (5c) exert upon one another. As previously mentioned, hot fluid enters from the upper left port on the third plate (5c) and is distributed in the second channel (20b). The pressure of the incoming fluid is monitored before the fluid is distributed out among the plates in the manner previously mentioned, viz. at any desired point along the fluid's flow path to the heat exchanger (2) from the last component (18) of the heat exchanger system (1), see FIG. 1.

The measured values from the sensors are registered and processed in a conventional processor. The processor monitors inter alia that the pressure of the fluid does not exceed the pressure which the gasket (6) and the plate (5c) exert upon one another. If the pressure of the fluid is greater than the gasket pressure, it means that risk of leakage through or round the gaskets (6) may arise. The values obtained for the pressure of the fluid and the gasket pressure are used for calculating a ratio between them which is a so-called differential pressure value. If changes in said differential pressure value exceed permissible limit values, also called set-values, an indicator is activated. The purpose of the indicator is to attract attention so that the process can be halted and the system can be subjected to necessary servicing operations.

In another alternative embodiment of the invention, a sensor (15c) is located on a second plate (5b) instead of on the third plate (5c). The sensor is situated between the gasket (6) and the plate (5b) in the same way as previously explained. The sensor (15c) is thus located at the upper left region of the second plate (5b, see FIG. 2), under the gasket (6) along the longitudinal left edge (8), lower than the upper left port (5a), and above the gasket diagonal (16). As the sensor (15c) is connected to the second plate (5b), the sensor (15c) also reacts to pressure changes taking place on the side of the second plate (5b) which is adjacent to the third plate (5c).

In a further alternative embodiment of the invention (not depicted in the drawings) a fragment of a gasket is placed in an environment corresponding to that prevailing in the aforesaid heat exchangers. Such simulation of the heat exchangers gasket situation makes it possible to be able to supervise and assess the risk of fluid leakage through a gasket located in the heat exchanger without any need to be in the immediate vicinity of the heat exchanger.

The invention is not limited to the embodiment referred to but may be varied and modified within the scopes of the claims set out below, as has been partly described above.

The invention claimed is:

1. A method for assessing, in a heat exchanger having a number of heat exchanger plates and intermediate gaskets therebetween, the functionality of a gasket material comprising
   using a first sensor to monitor a compression pressure of a gasket material,
   registering and processing in a processor a value monitored by the first sensor to assess an associated risk of leakage of a fluid flowing through the heat exchanger,
   comparing the value monitored with a predetermined set-value and
   in the event of deviation between the monitored value and the predetermined set-value, activating an indicator before leakage through or past the gasket occurs.

2. A method according to claim 1 further comprising using the value monitored to derive a ratio to compare with a predetermined set-value.

3. A method according to claim 1, further comprising monitoring a pressure of the fluid.

4. A method according to claim 3, wherein the pressure of the fluid is monitored by a second sensor.

5. A method according to claim 3, wherein the pressure of the fluid relative to the gasket material is monitored by a second sensor.

6. A method according to claim 4, wherein at least one of the sensors has fluid contact with the fluid of the heat exchanger.

* * * * *